(12) United States Patent
Stiles

(10) Patent No.: US 10,851,510 B2
(45) Date of Patent: Dec. 1, 2020

(54) DEICING DEVICE AND METHOD OF MANUFACTURE

(71) Applicant: Tom Stiles, Hudson, WI (US)

(72) Inventor: Tom Stiles, Hudson, WI (US)

(*) Notice: Subject to any disclaimer, the term of this patent is extended or adjusted under 35 U.S.C. 154(b) by 4 days.

(21) Appl. No.: 15/997,916

(22) Filed: Jun. 5, 2018

(65) Prior Publication Data

US 2018/0347132 A1 Dec. 6, 2018

Related U.S. Application Data

(60) Provisional application No. 62/515,780, filed on Jun. 6, 2017, provisional application No. 62/550,081, filed on Aug. 25, 2017.

(51) Int. Cl.
| | | |
|---|---|---|
| *E01H 10/00* | (2006.01) | |
| *B29C 43/00* | (2006.01) | |
| *B29C 43/10* | (2006.01) | |
| *B29C 43/52* | (2006.01) | |
| *B30B 11/02* | (2006.01) | |
| *B30B 11/04* | (2006.01) | |

(52) U.S. Cl.
CPC ......... *E01H 10/007* (2013.01); *B29C 43/006* (2013.01); *B29C 43/102* (2013.01); *B29C 43/52* (2013.01); *E01H 10/00* (2013.01); *B30B 11/027* (2013.01); *B30B 11/04* (2013.01)

(58) Field of Classification Search
CPC .................................................... E01H 10/00
USPC ........................................................ 106/13
See application file for complete search history.

(56) References Cited

U.S. PATENT DOCUMENTS

| | | | | |
|---|---|---|---|---|
| 2,988,509 A | * | 6/1961 | Schilberg | C09K 3/185 252/70 |
| 5,211,869 A | * | 5/1993 | Steinhauser | C09K 3/185 106/13 |
| 9,139,758 B2 | * | 9/2015 | Matuszczak | C09K 3/185 |

* cited by examiner

*Primary Examiner* — William P Watkins, III
(74) *Attorney, Agent, or Firm* — Vidas, Arrett & Steinkraus, P.A.

(57) ABSTRACT

An ice melting device formed into an impact dispersion projectile for melting ice. The projectile being formed of salt and other ice melting chemicals. The ice melting compound is mixed, placed into a jig, dipped into a combination of liquid detergent and water then drained, compressed, heated, and then cooled. The projectile may then be removed from the jig and packaged. The projectile may be thrown by an individual onto an ice coated surface where the projectile upon impact will disintegrate and disperse the ice melting salt and ice melting chemicals onto the ice coated surface initiating the melting of the ice.

9 Claims, 8 Drawing Sheets

DEICING DEVICE AND METHOD OF MANUFACTURE

CROSS-REFERENCE TO RELATED APPLICATIONS

This application claims priority to U.S. Provisional Patent Application Ser. No. 62/515,780 filed Jun. 6, 2017 and U.S. Provisional Patent Application Ser. No. 62/550,081 filed Aug. 25, 2017 the entire contents of both provisional patent applications being incorporated by reference herein in there entireties.

BACKGROUND OF THE INVENTION

During winter months many geographic areas within the United States experience packed snow and ice conditions on ground or paved surfaces. The ground or paved surfaces include, but are not necessarily limited to parking lots, driveways and sidewalks.

Accumulated packed snow and ice on ground or paved surfaces significantly increases risk of falling and injury to an individual walking upon the surface.

Individuals have attempted to remove accumulated packed snow and ice from ground or paved surfaces through chipping, shoveling, and use of salt or salt and ice melting chemical compositions. Individuals attempting to remove accumulated packed snow and ice from a frozen and slippery surface have frequently needed to step onto the hazardous surface to engage in ice removing activities, or to spread salt or salt and ice melting chemical compositions.

Individuals engaging in ice removal activities are frequently forced to incur a significant risk of falling in order to improve the future safety to individuals walking upon an ice coated ground or paved surface.

The disclosed invention significantly improves the safety to individuals engaging in activities directed to the removal of packed snow or ice on ground or paved surfaces.

GENERAL DESCRIPTION OF THE INVENTION

In general the invention may be described as relating to ground impact dispersion technology, fan dispersion technology or square it up technology for the application of salt, or a combination of salt and ice melting chemicals, on ice or snow packed surfaces, to facilitate the melting and removal of the packed snow and ice.

In general, the invention is directed to impact dispersion technology for removal of accumulated ice from sidewalks, driveways, parking lots and other surfaces to improve safety for individuals. In general the invention may be described as an impact dispersion ice melting projectile which may be cylindrical, conical or spherical in shape.

The impact dispersion ice melting projectile may be provided in any number of sizes depending upon the area of ice to be treated with salt and/or additional ice melting chemicals for removal of ice from a surface.

The impact dispersion ice melting projectile is provided in a convenient shape for tossing or throwing by an individual for impact upon a designated area, thereby improving the safety to an individual by minimizing the necessity for an individual to walk out upon an ice coated surface to apply ice melting materials.

Individuals using the impact dispersion ice melting projectile may stand upon a dry, non-ice coated surface such as a garage, within the doorway of a dwelling, or even within an automobile, whereupon the individual may toss one or more of the impact dispersion ice melting projectiles onto an ice coated surface for dispersion of the mixed salt and ice melting chemicals prior to stepping out onto the ice surface.

DETAILED DESCRIPTION OF THE PREFERRED EMBODIMENTS

Figure 1:
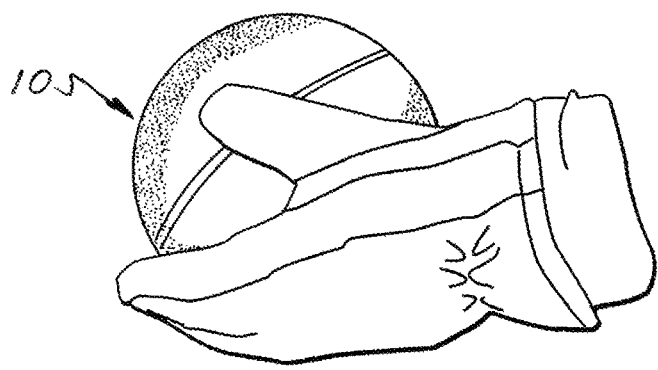
FIG. 1 is an isometric view showing one embodiment of an impact dispersion ice melting projectile according to the disclosed invention.

In general, the invention is directed to impact dispersion technology for removal of accumulated ice from sidewalks, driveways, parking lots and other surfaces covered in ice to improve safety for individuals. In at least one embodiment the invention may be described as an impact dispersion ice melting projectile which is identified by the reference numeral 10.

The impact dispersion ice melting projectile 10 may be provided in any number of shapes and sizes depending upon the area of ice to be treated with salt and/or salt combined with ice melting chemicals, for removal of ice from a surface.

In some embodiments the impact dispersion ice melting projectile 10 is identified as having a cylindrical, conical or spherical shape in order to facilitate compaction of the salt and chemicals into a conveniently shaped projectile for throwing, where the shape following formation reduces chipping and/or crumbling of the impact dispersion ice melting projectile 10 prior to application/use. In addition, the impact dispersion ice melting projectile 10 is provided in a convenient size and shape to facilitate accurate throwing to a designated area, thereby improving the safety to an individual by minimizing the necessity for an individual to walk out upon an ice coated surface to apply ice melting materials. It should be noted that the impact dispersion ice melting projectile 10 is not required to be provided in any particular symmetrical or non-symmetrical shape, and may be of any shape which is convenient for throwing by an individual, and which maintains the formed shape prior to contact with a surface and dispersion onto the surface.

In some embodiments, the impact dispersion ice melting projectile 10 may be tossed by an individual in the air at a desired trajectory in order to alter the impact dispersion pattern 12 of the impact dispersion ice melting projectile 10 upon striking an ice coated surface. The impact dispersion pattern 12 may be altered by selecting one of an infinite variety of velocities of the toss of the impact dispersion ice melting projectile 10 and/or the trajectory for the impact dispersion ice melting projectile 10 prior to impact upon an ice coated surface. An impact dispersion ice melting projectile 10 as tossed by an individual upon striking an ice coated surface will explode and widely disperse 12 the mixed salt and ice melting chemicals over a wide area of ice.

In some embodiments, the impact dispersion ice melting projectile 10 may be grouped into any number of individual units and placed in any type of carrier 14 which may be similar in appearance to an enlarged egg carton or other transportation device.

Individuals using the impact dispersion ice melting projectile 10 may stand within a dry, non-ice coated surface such as a garage or within the doorway of a dwelling, or even within an automobile, whereupon the individual may toss the impact dispersion ice melting projectile 10 out onto an ice coated surface for dispersion 12 of the mixed salt and ice melting chemicals prior to stepping out onto the ice surface. Safety to individuals is thereby improved.

Figure 2:
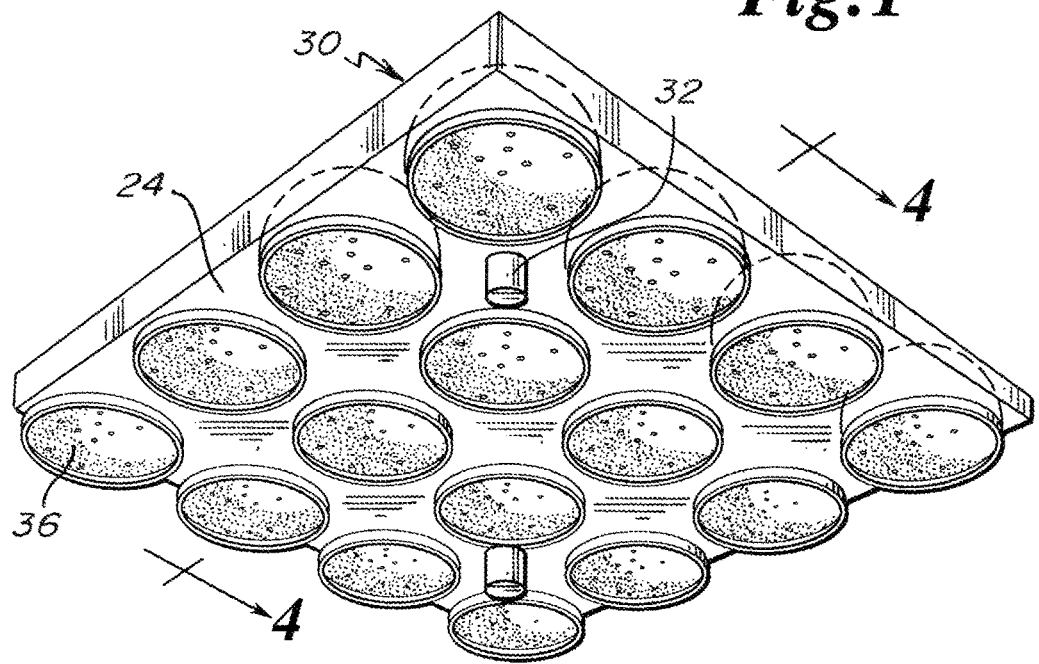
FIG. 2 is an isometric and partial phantom line view showing one embodiment of a form or mold used in the manufacture of the disclosed invention.
Figure 2:
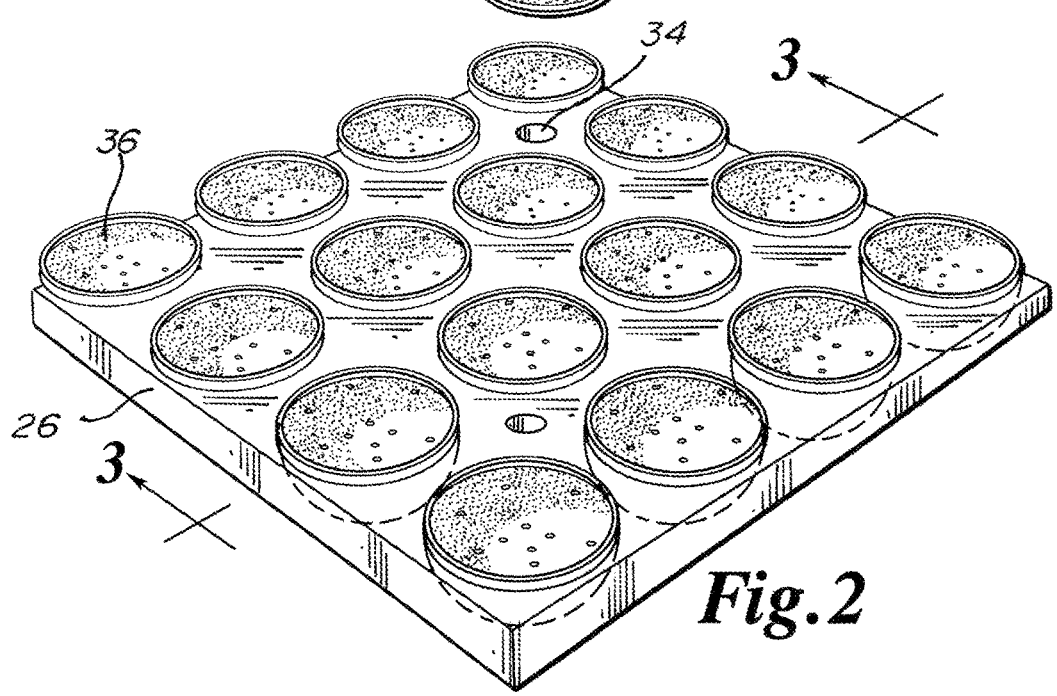

As may be seen in FIG. 2 in one alternative embodiment an upper mold unit 24 and a lower mold unit 26 may be used to compress mixed salt or salt and ice melting chemicals, liquid detergent, and water 28 during compression and the formation of the impact dispersion ice melting projectile 10. The upper mold unit 24 and a lower mold unit 26 may include any desired number of cavities 36 for receipt of the mixed salt or salt and ice melting chemicals, liquid detergent, and water 28 as desired by an individual. The upper mold unit 24 and a lower mold unit 26 may be square rectangular or any other shape as desired by an individual for the formation of the impact dispersion ice melting projectiles 10.

In at least one embodiment the diameter of the cavities 36 of the upper mold unit 24 are smaller than the diameter of the cavities 36 of the lower mold unit 26 to provide an internal nesting of the upper mold unit 24 into the lower mold unit 26, and the compression of the upper mold unit 24 into the lower mold unit 26 during the formation of the impact dispersion ice melting projectiles 10. In this embodiment, a downward force is applied to the back 30 of the upper mold unit 24, where the individual cavities 36 of the upper mold unit 24 are disposed to the interior of the individual cavities 36 of the lower mold unit 26, where the downward force on the back 30 functions, through the use of pressure, to force the upper mold unit 24 downwardly within the lower mold unit 26, to compress the mixed salt or salt and ice melting chemicals, liquid detergent, and water 28 into the individual impact dispersion ice melting projectiles 10.

In at least one alternative embodiment, the diameter for the individual cavities 36 for the upper mold unit 24 may be larger than the diameters for the individual cavities 36 of the lower mold unit 26. In this embodiment the individual cavities 36 of the lower mold unit 26 are inserted within the interior of the individual cavities 36 of the upper mold unit 24 during compression of the mixed salt or salt and ice melting chemicals, liquid detergent, and water 28 into the individual impact dispersion ice melting projectiles 10.

The compression of the upper mold unit 24 and the lower mold unit 26 together may occur until a desired resistance is achieved. The compression resistance may be provided by a pressure sensor (not shown) as is known in the art.

In at least one embodiment, one of the upper mold unit 24 and the lower mold unit 26 may include one or more guide members 32, and the other of the upper mold unit 24 and the lower mold unit 26 may include a corresponding number of guide apertures 34 which together are used to facilitate alignment between the upper mold unit 24 and the lower mold unit 26 during the formation of the individual impact dispersion ice melting projectiles 10.

In general the upper mold unit 24 and the lower mold unit 26 are formed of metallic materials which may withstand exposure to heat of approximately 400 degrees Fahrenheit for a period of time of approximately 45 minutes.

Figure 3:
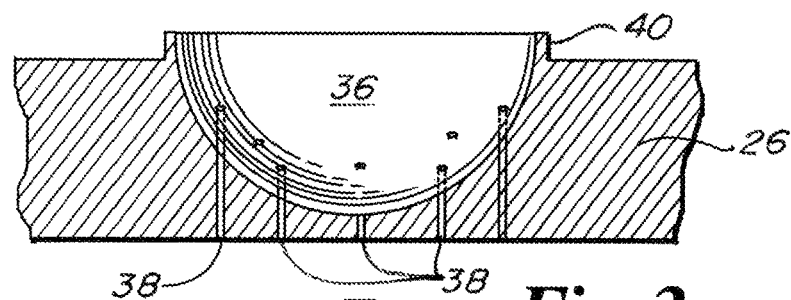
FIG. 3 is a detail cross-sectional side view of one embodiment of one mold of the lower mold unit taken along the line 3-3 of FIG. 2.

Referring to FIG. 3, in one embodiment the lower mold unit 26 is shown in a cross-sectional side view. The lower mold unit in this embodiment includes cavities 36 which are semi-spherical in shape. The lower mold unit 26 may include one or more drainage passages 38 to facilitate the removal of water from the formed individual impact dispersion ice melting projectiles 10 before and during heating. The drainage passages 38 with the assistance of gravity and the compression of the upper mold unit 24 into the lower mold unit 26 permit excess water and moisture to be removed from the impact dispersion ice melting projectiles 10 to facilitate the integrity and cohesiveness of the projectiles 10 prior to use.

As may be seen in FIG. 3, in at least one embodiment, the lower mold unit 26 includes an raised edge 40 which is proximate to the upper edge of the individual cavities 36. The raised edge 40 extends upwardly from the top surface of the lower mold unit 26.

Figure 4:
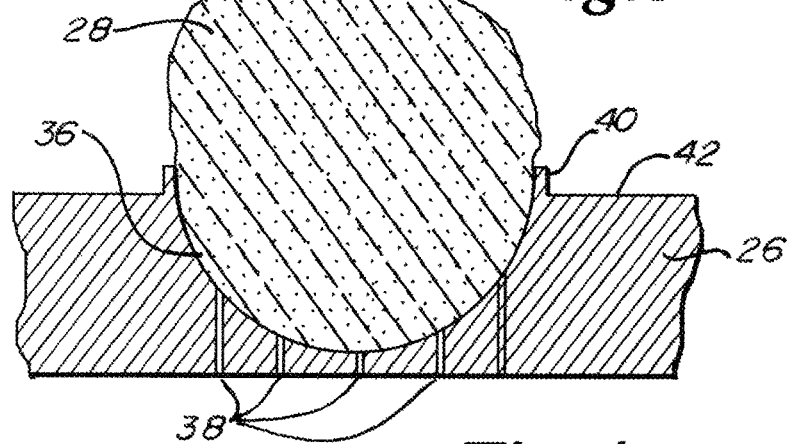
FIG. 4 is a detail cross-sectional side view of one embodiment of one mold of the lower mold unit taken along the line 3-3 of FIG. 2 including the mixed salt or salt and ice melting chemicals prior to the formation of the impact dispersion ice melting projectile according to the disclosed invention.

As may be seen in FIG. 4, in one embodiment, an ample or slightly excessive amount of mixed salt or salt and ice melting chemicals, liquid detergent, and water 28 may be deposited into one or more individual cavities 36 of the lower mold unit 26.

Figure 5:
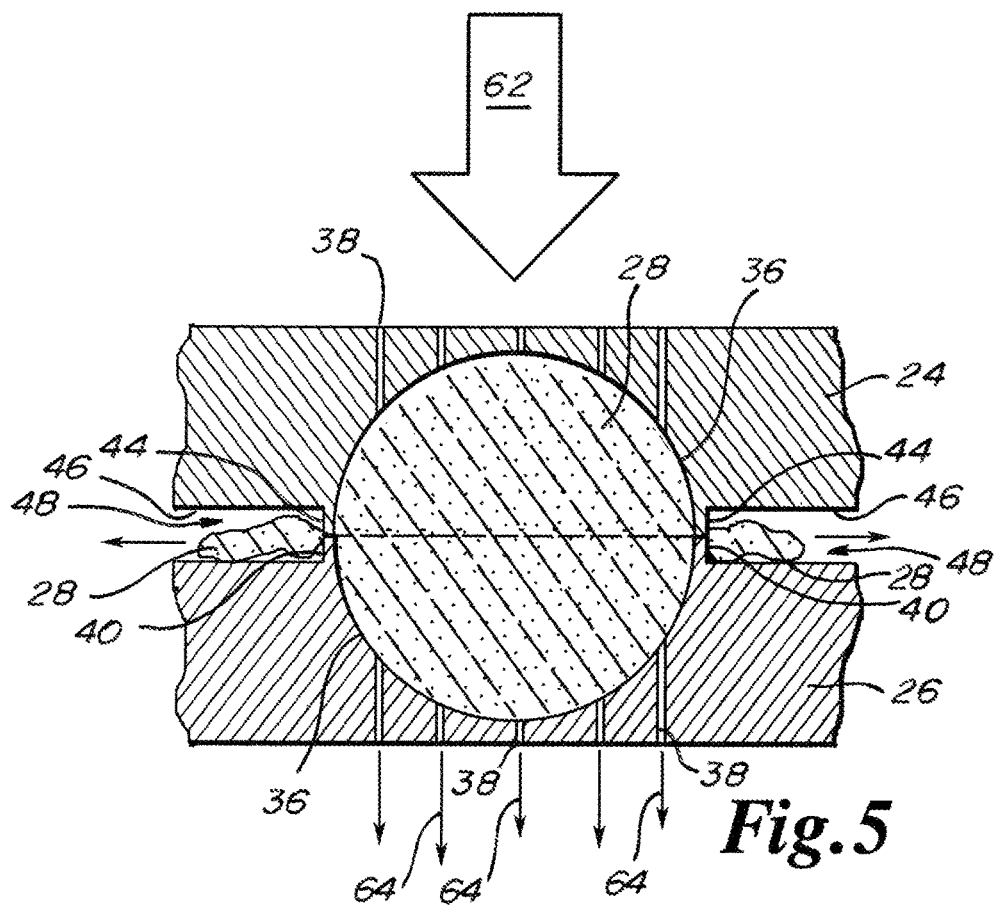
FIG. 5 is a detail cross-sectional side view of one embodiment of one mold of the upper mold unit and the lower mold unit taken along the lines 3-3 and 4-4 of FIG. 2, including the mixed salt or salt and ice melting chemicals during compression and the formation of the impact dispersion ice melting projectile according to the disclosed invention.

As may be seen in FIG. 5, following the placement of the mixed salt or salt and ice melting chemicals, liquid detergent, and water 28 into the cavities 36 of the lower mold unit 26, the upper mold unit 24 may be aligned and pressed downwardly onto the lower mold unit 26 as represented by arrow 62. The drainage of excess water from the interior of the cavities 36 through the drainage passages 38 is represented by arrows 64.

In some embodiments the upper mold unit 24 is a mirror image of the lower mold unit 26 an includes drainage passages 38, a descending edge 44, and an interior surface 46. In some embodiments, a gap 48 is established between the top surface 42 of the lower mold unit 26 and the interior surface 46 of the upper mold unit 24. Compression between the upper mold unit 24 and the lower mold unit 26 may then force excess ice melting chemicals, liquid detergent, and water 28 outwardly from the individual cavities 36 and into the gap 48 between the upper mold unit 24 and lower mold unit 26 as shown in FIG. 5.

In the embodiment shown in FIG. 3 through FIG. 5, the projectile 10 is formed into a spherical shape.

Figure 6:
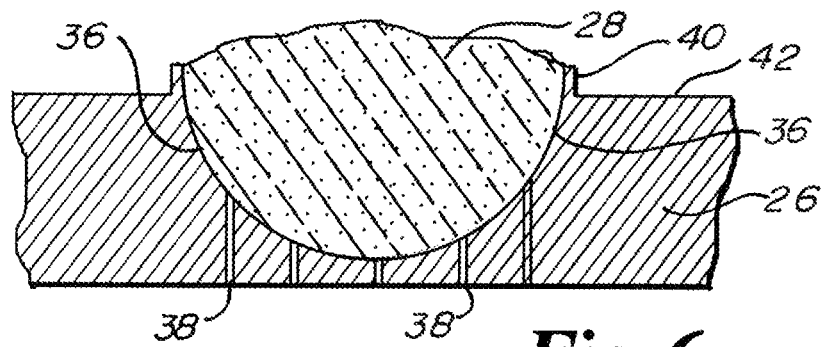
FIG. 6 is an alternative detail cross-sectional side view of one embodiment of one mold of the lower mold unit taken along the line 3-3 of FIG. 2, including the mixed salt or salt and ice melting chemicals during the formation of one alternative embodiment of the impact dispersion ice melting projectile according to the disclosed invention.
Figure 7:
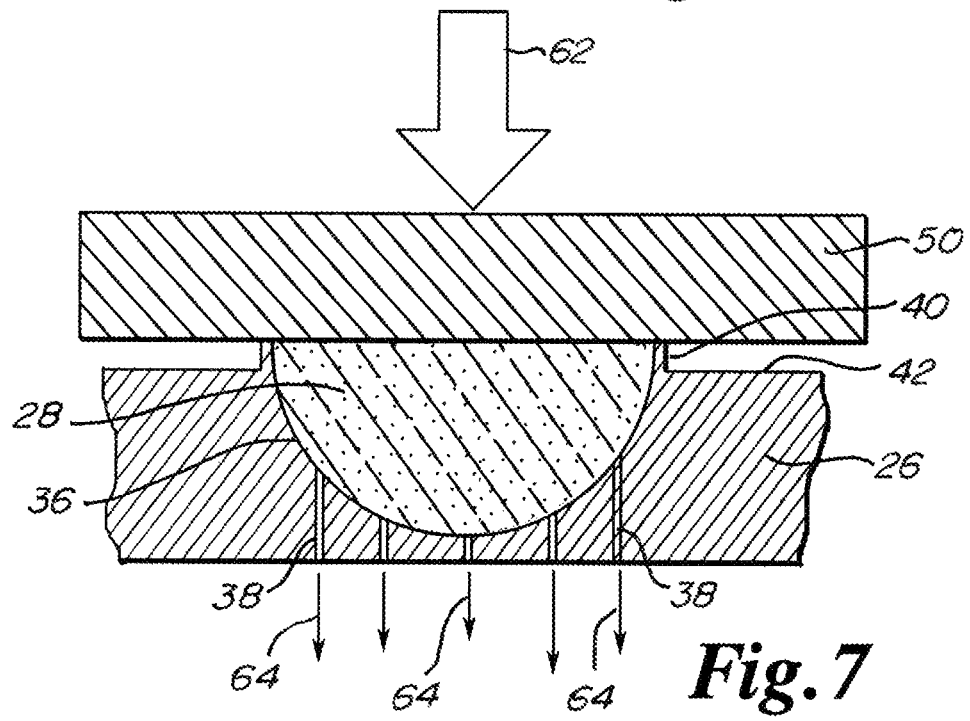
FIG. 7 is a detail cross-sectional side view of one embodiment of one mold of the lower mold unit taken along the lines 3-3 of FIG. 2, including the mixed salt or salt and ice melting chemicals and press during compression and the formation of one alternative embodiment of the impact dispersion ice melting projectile according to the disclosed invention.
Figure 8:
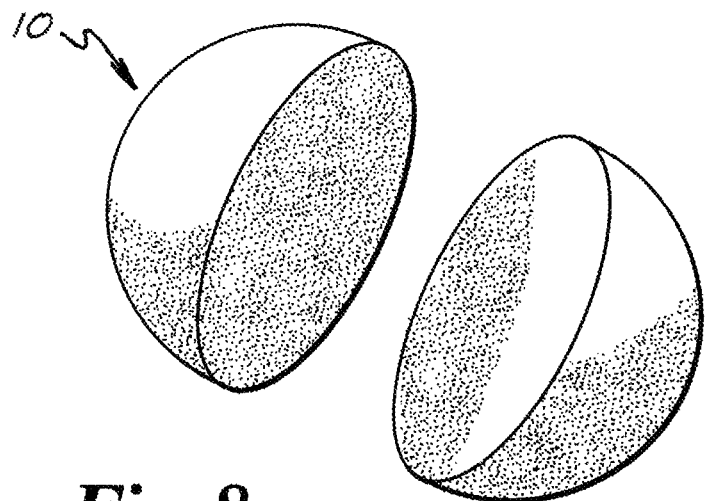
FIG. 8 is a detail isometric view of one alternative embodiment of the compressed mixed salt or salt and ice melting chemicals, liquid detergent, and water prior to the formation of one alternative embodiment of the impact dispersion ice melting projectile according to the disclosed invention.

Referring to FIG. 6 through FIG. 8, the lower mold unit 26 is substantially identical to the embodiments described relative to FIG. 3 through FIG. 5. As may be seen in FIG. 7, a horizontal press 50 is forced downwardly represented by arrow 62 onto the top of the individual cavities 36 of the lower mold unit 26. The drainage of excess water from the interior of the cavities 36 through the drainage passages 38 is represented by arrows 64. The ice melting chemicals, liquid detergent, and water 28 are then compressed into a semi-spherical shape as shown in FIG. 8. The semi-spherical shapes of the projectile 10 may then be used individually or may be combined together to form a spherical projectile 10.

In some embodiments the spherical projectile 10 may be formed from two semi-spherical units by the placement of a layer of ice melting chemicals, liquid detergent, and water 28 proximate to the flat interior surface of the semi-spherical shapes. The two semi-spherical shapes may then be compressed together to form the spherical projectile 10.

Figure 9:
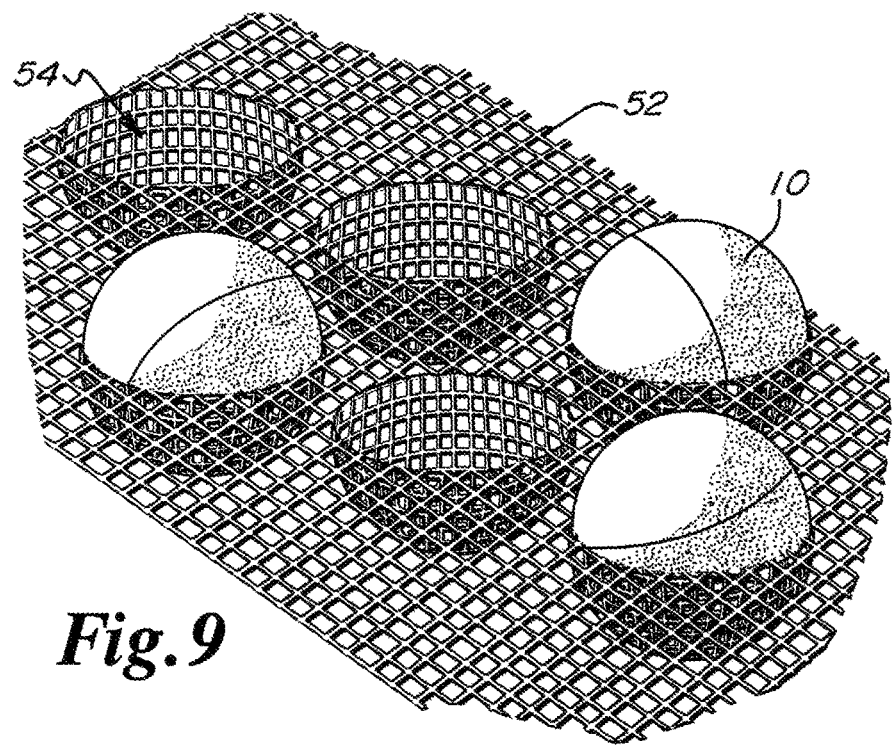
FIG. 9 is a detail isometric view of one alternative embodiment of a heating rack transporting compressed impact dispersion ice melting projectiles according to the disclosed invention.

Referring to FIG. 9, in one embodiment, after the projectiles 10 have been formed, the projectiles 10 are placed into a heating transport rig 52. The heating transport rig 52 may be formed of metallic mesh material. The heating transport rig 52 in alternative embodiments may be formed of other metallic material and is not required to be formed of mesh. In some embodiments the heating transport rig 52 includes a plurality of pockets 54 where each pocket 54 receives one projectile 10 for transport to a heating element. In at least one embodiment the pockets 54 may be coated with a non-stick material to facilitate the extraction and removal for the projectiles 10 from the individual pockets 54 following heating.

Figure 10:
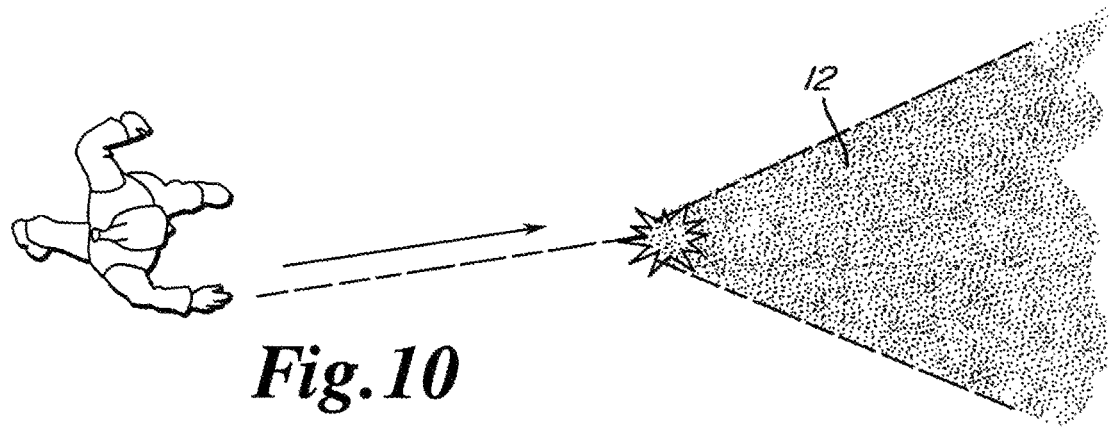
FIG. 10 is a top environmental view showing the use of the impact dispersion ice melting projectile according to one embodiment of the disclosed invention, as the same is applied to an ice coated surface.

FIG. 10 is a depiction of an individual using a projectile 10, and in one embodiment of an impact dispersion pattern 12 of ice melting materials following contact of the projectile 10 with an ice coated surface.

Figure 11:
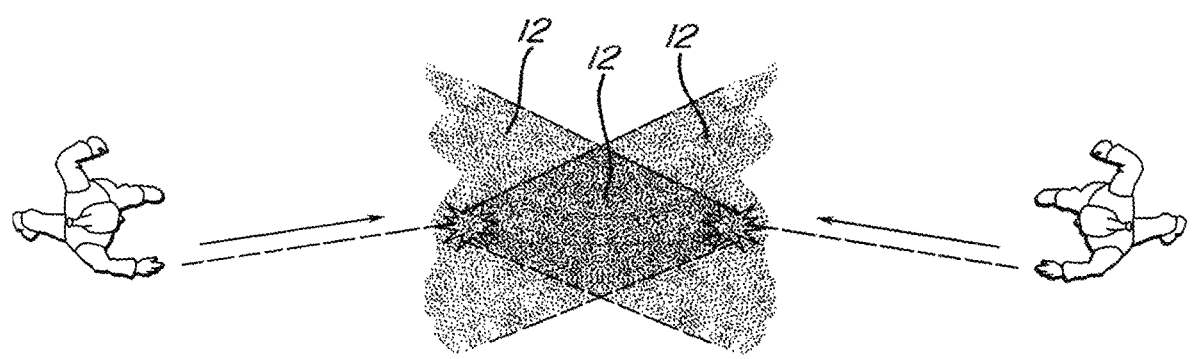
FIG. 11 is an alternative top environmental view showing the use of the impact dispersion ice melting projectile according to one embodiment of the disclosed invention, as the same is applied to an ice coated surface.

FIG. 11 is a depiction of an individual using a projectile 10, and in one embodiment an alternative impact dispersion pattern 12 of ice melting materials following contact of the projectile 10 with an ice coated surface. In FIG. 11, the individual has first used one projectile 10 on one side of an ice coated surface, and then has moved to the opposite side of the ice coated surface to apply a second projectile 10 in an overlapping impact dispersion pattern 12 relative to the initial impact dispersion pattern 12. It should be noted that an individual is not required to have an accurate toss or perfect aim during the use of an impact dispersion ice melting projectile 10, because the impact dispersion pattern 12 will naturally compensate for an imperfect toss or aim covering a desired area with the ice melting compounds.

Figure 12:
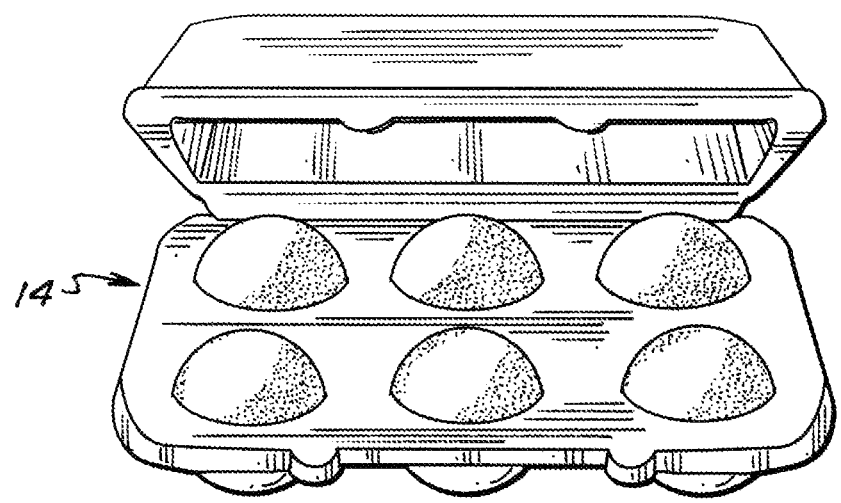
FIG. 12 is an alternative isometric environmental view showing impact dispersion ice melting projectiles according to one embodiment of the disclosed invention within a carrier prior to application onto an ice coated surface.
Figure 13:
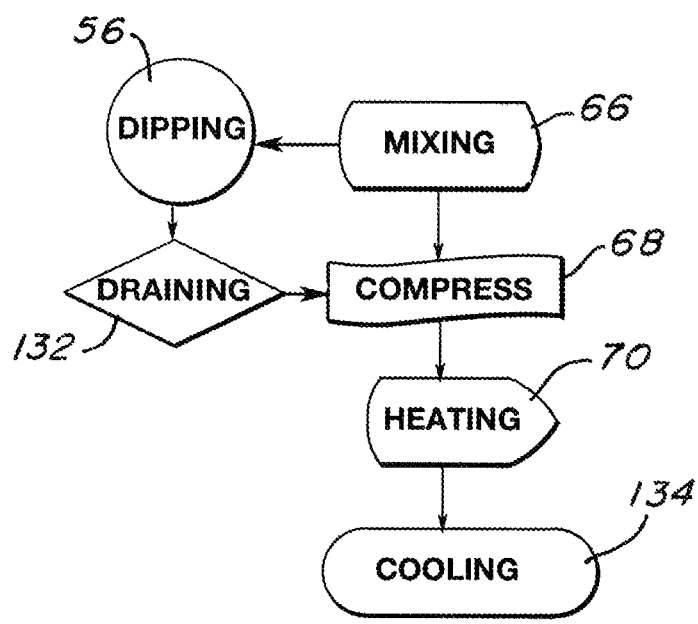
FIG. 13 is a block diagram for the formation of one embodiment of the impact dispersion ice melting projectiles according to the disclosed invention.
Figure 14:
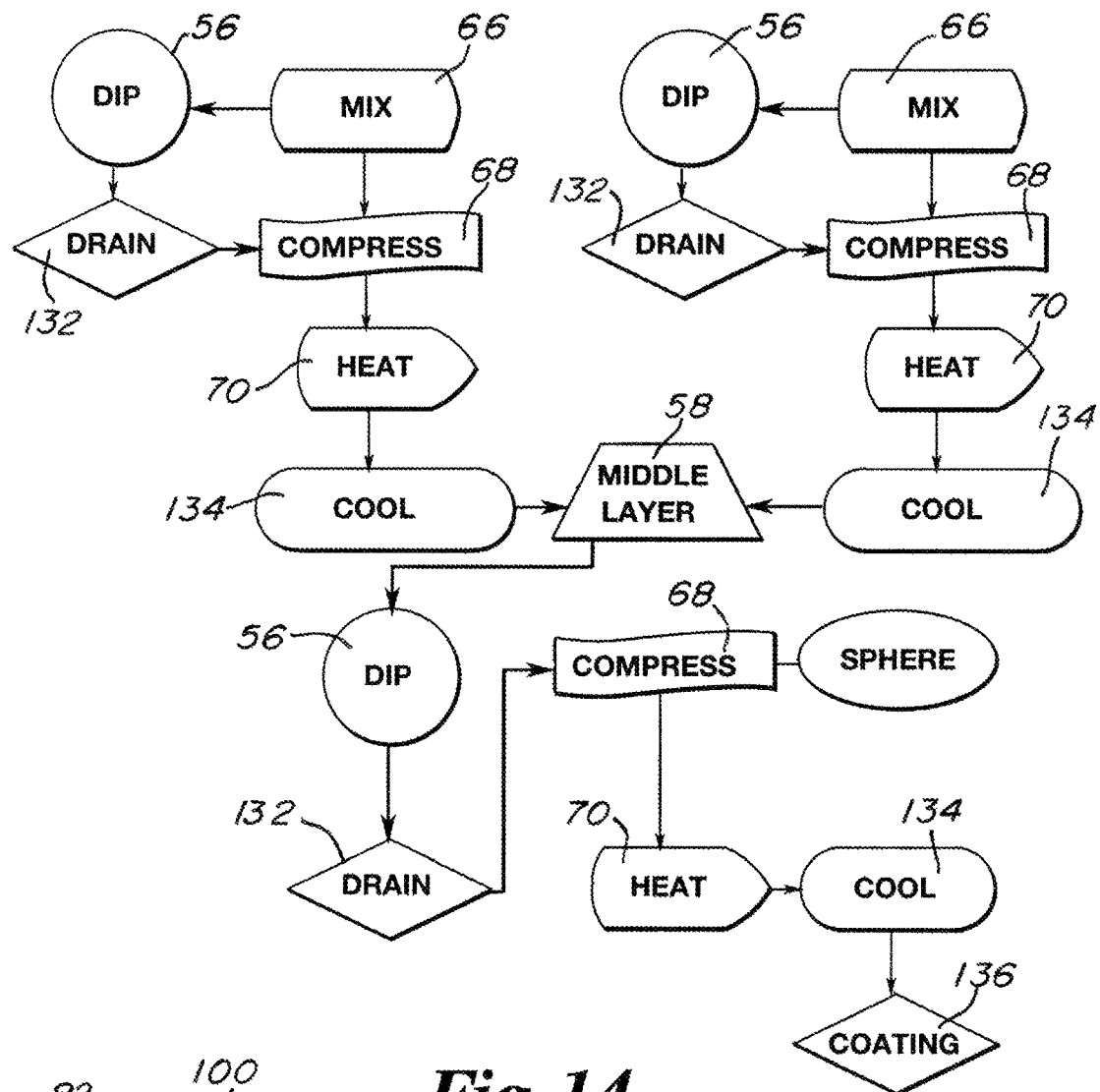
FIG. 14 is an alternative block diagram for the formation of one embodiment of the impact dispersion ice melting projectiles according to the disclosed invention.

FIG. 12 is a depiction of one embodiment of a carrier 14 holding a plurality of impact dispersion ice melting projectiles 10 prior to use in the removal of ice from an ice coated surface.

In one embodiment a 50 pound package of sodium chloride (salt), calcium chloride, ice melting chemicals, and/or rock salt, and combinations thereof, may be mixed 66 with one ounce of liquid detergent identified by the trademark Dawn® and one gallon of cold water. An individual may then compress 68 the mixed salt and ice melting chemicals or rock salt, liquid detergent, and water into impact dispersion ice melting projectiles 10, making any number of large, medium, or small projectiles 10 as desired for application onto ice coated surfaces.

In at least one embodiment, following compression 68 the mixed salt or salt and ice melting chemicals, liquid detergent, and water 28 into projectiles 10, the projectiles 10 are placed onto a rack or rig 52 for insertion into a pre-heated oven, furnace, or other type of heating unit 22 for heating 70. The oven, furnace or heating unit 22 is pre-heated to a temperature of 400° F., and the projectiles 10 are exposed to heat for a period of time of approximately 40 to 45 minutes, whereupon the projectiles 10 are removed from exposure to heat. The heating 70 of the projectiles 10 retains the components in a unitary and compact configuration, which does not disintegrate or disperse 12 until such time as the projectile 10 is tossed by an individual, and strikes an ice coated surface, whereupon dispersion 12 occurs to facilitate melting of ice upon a surface.

In some embodiments, hand soap, a degreaser, or dish soap may be substituted for the Dawn® liquid detergent.

In some alternative embodiments, potassium chloride is mixed with the salt or salt and ice melting chemicals, liquid detergent and water 28 prior to the formation and compression 68 of the projectiles 10. Potassium chloride may additionally function as a fertilizer, and may be grass friendly for use on sidewalks coated with ice.

In other embodiments products available from Reinders identified as Reinders—Meteor Melt; Spring Valley—Professional Ice Melter with Platinum Defrost; Spring Valley—SuperMelt with Defrost; OxyChem—Peladow Calcium Chloride; Kissner—Landscapers Choice with CMA; and Reinders—No More Ice, may be used as the initial salt or salt and ice melting chemicals to be mixed with the liquid detergent and water during the formation and compression 68 of the projectiles 10. These identified products are representative of the types of products which may be used in the practice of the invention and do not limit the different types of compounds which will adequately function to disperse 12 ice melting compounds upon an ice coated surface to melt ice.

In some embodiments, the above identified ice melting compounds/products include Magnesium Chloride, Calcium Chloride, and Sodium Chloride, blends of calcium, magnesium, potassium and sodium chlorides, where the compounds may be coated with Defrost® and then may be treated with an anti-caking agent, where Defrost® is an organic anti-icing agent that improves the performance of common ice melting ingredients. Defrost® is derived from fermented and distilled corn, and when used alone it has a freezing point of −78° F. When combined with common ice melting ingredients, Defrost® increases effectiveness and reduces chloride use by as much 33-50%, making it safer for pets, children and plants. The identified compounds/products may also be formed of, or include an organic anti-sticking agent, Salt, Urea, Potassium Chloride or combinations of these ingredients, as well as magnesium, potassium, and sodium chloride. Defrost® is available from Reinders located in Sussex, Wis. In some embodiments the identified compounds may contain 90% calcium chloride, an inorganic salt produced by removing water from a naturally occurring brine solution, Calcium Magnesium Acetate, Potassium Chloride, Calcium Chloride, and Sodium Chloride.

In some embodiments, two large projectiles 10 may be utilized to disperse 12 ice melting salt and other ice melting compounds over a 400 ft.$^2$ surface area as coated with ice. In some embodiments, one large projectile 10 may be tossed or thrown for dispersion 12 upon any desired area or location. In some embodiments following the initial toss of a projectile 10, an individual may then walk approximately 20 feet or more away from the impact location of the first projectile 10, in any desired direction, and may toss a second projectile 10 in a direction toward, away, in a direction normal to, or in a direction angularly offset from the first impact site, to impact approximately twenty feet from the first impact site. The dispersion pattern 12 of the two projectiles 10 may cover approximately 400 ft.$^2$ of surface ice. For comparison purposes, a large projectile 10 will be the approximate size of a commonly used softball. It should be noted that the dispersion pattern 12 will vary depending upon the velocity of the toss, the length of the throw, and the trajectory of the toss of the projectile 10.

In certain alternative embodiments, a surfactant and/or polymers may be added to the salt or salt and ice melting components, liquid detergent, and water 28 to form the projectiles 10 of ice melting compounds.

In some embodiments, the projectiles 10 may not be symmetrical in shape, and will be mostly round, roundish in shape, conical or cylindrical in shape which will assist in minimization of chipping or fracture of the projectiles 10 following formation. In a preferred embodiment the projectiles 10 will be mostly edgeless.

It should be noted that the temperatures and times identified herein for heating 70 of the compressed projectiles 10 may be adjusted as desired, where higher heating temperatures may reduce heating exposure time, and lower heating temperatures may increase heating exposure time. In general it is anticipated that the range of heating temperatures will be between 275 degrees and 525 degrees Fahrenheit.

Polymers may also be used in combination with the salt and salt and ice melting compounds identified herein during the formation of the projectiles 10. It should be noted that the polymers identified in this disclosure have been provided for illustrative purposes, and other equivalent polymers may be utilized in the practice of the invention. The polymers identified herein are not restrictive of the types of polymers which will provide adequate performance in the practice of the invention.

In some embodiments, the projectiles 10 may be formed through the use of a perforated round metallic holder or perforated mold such as a metal colander or strainer. Various sizes of holders or perforated molds may be used in the formation of the projectiles 10 which may be similar in size to a softball, baseball, tennis ball, cone shape, cylinder, soup can shape or an egg shape. The size selected for the projectiles 10 may affect the volume and/or concentration of ice melting materials within the dispersion area.

In at least one method of manufacture a metal strainer, perforated mold, or mesh conical retainer 78 may be placed into a heating transport rig 52. The metal strainer, perforated mold, or mesh conical retainer 78 may then be filled with salt, or a mixture of salt and potassium chloride, calcium chloride or other ice melting compounds/chemicals as identified above. The mold, strainer, or mesh conical retainer 78 containing the salt based compound may be transported by the heating transport rig 52 to a bath 80 containing water mixed with the liquid detergent or other desired chemicals, compounds, polymers and combinations thereof. The heating transport rig 52 transporting one or more of the mesh conical retainers 78 the may then be dipped 56 in a container, bath 80, or bucket containing the mixture of cold or room temperature water and a drizzle or one ounce of surfactant or liquid detergent such as Dawn®, other soap, or a polymer, whereupon the mold, strainer and/or metal strainer, perforated mold, or mesh conical retainer 78 may be drained 132 of excess water and then placed into an oven pre-heated to a temperature of 400° Fahrenheit for approximately 40 to 45 minutes. The mold, strainer, or mesh conical retainer 78 is then removed from the oven and permitted to cool 134, which forms a tightly compact projectile 10. The projectile 10 may then be placed into a carton or carrier 14 for shipping.

Alternatively, the salt compound and/or salt and potassium chloride or other compound as placed within the perforated mold, strainer, or mesh conical retainer 78 as transported by the heating transport rig 52 may be dipped 56 in only water and then drained 132, compressed 68 and heated 70 as described above. The projectile 10 formed by this alternative method may be stiff and brittle having a high TG +30-40° C.

In an alternative manufacturing method an individual may use two identical half sphere strainers or perforated molds as shown in FIG. 6 through FIG. 8, where each half sphere strainer contains the salt and/or salt and potassium chloride or other salt based compound. Each of the half sphere strainers may then be dipped 56 into the solution as identified above having water, a liquid detergent, surfactant, soap, or polymer. Each half sphere may then be drained 132, compressed 68 and heated 70 as identified above and allowed to cool 134. An individual may then put an additional filling or a middle layer 58 of moist salt or salt and potassium chloride or other salt based compound between the two half spheres, sandwiching the middle layer 58 between the two half spheres. The two half spheres sandwiching the middle layer 58 may then be dipped 56 into the solution having water, liquid detergent, surfactant, soap or polymer and then drained 132, compressed 68 and heated 70 at a temperature of 400° Fahrenheit for approximately 40 to 45 minutes whereupon the heat is terminated. The formed projectiles 10 are then allowed to cool 134 and to be packaged.

In an alternative manufacturing method, the mesh conical retainer 78 may have an open top area 82 which is used to receive the salt and/or salt and potassium chloride or other salt based compound prior to dipping 56. The mesh conical retainer 78 is constructed and arranged to receive an ample portion of salt and/or salt and potassium chloride or other salt based ice melting compounds. The mesh conical retainer 78 may then be dipped 56 into the bath 80 having water, liquid detergent, a surfactant, soap, or polymer. A compression element 72 having a desired mass, may then be placed onto the open top area 82 of the mesh conical retainer 78 for gravity to compress 68 the salt and/or salt and potassium chloride or other salt based compound, within the mesh conical retainer 78. The use of the compression element 72 having a desired mass facilitates the draining and compaction of the salt and/or salt and potassium chloride or other salt based ice melting compounds. The metal mesh conical retainer 78 holding the salt and/or salt and potassium chloride or other salt based ice melting compounds which has been dipped 56 in the water and liquid detergent solution, and which receives the compression element 72, may then be drained 132, heated 70 and dried as identified above and allowed to cool 134. The compression element 72 may then be removed from the open top area 82, and the formed projectiles 10 may be separated from the metal mesh conical retainer 78 and packaged.

It should be noted that in at least one embodiment, that a compression element 72 is not required to be utilized. I this embodiment, the salt and/or salt and potassium chloride or other salt based ice melting compounds which have been dipped 56 in the water and liquid detergent solution may compressed naturally under the weight of the ice melting compounds to form the projectiles 10. Further, it should be noted that the salt and/or salt and potassium chloride or other salt based ice melting compounds which have been dipped 56 in the water and liquid detergent solution in any of the above-described embodiments may not be subjected to compression force and may be permitted to compress naturally during the heating process.

Figure 15:
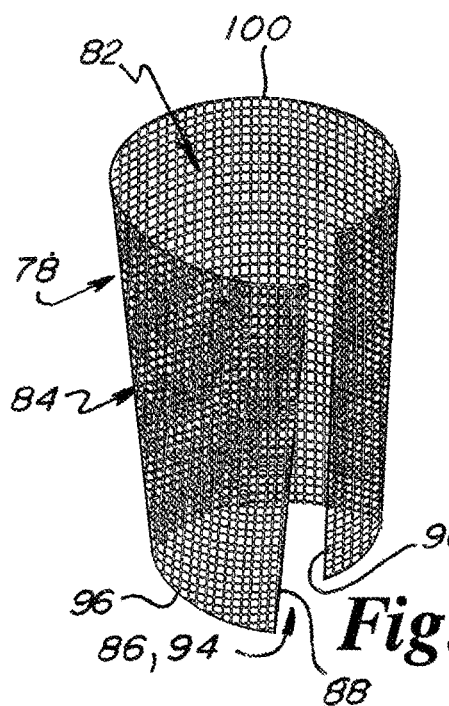
FIG. 15 is an alternative detail isometric view of one embodiment of a mesh conical retainer according to the disclosed invention.

In at least one alternative embodiment a mesh conical retainer 78 may be seen in FIG. 15. The mesh conical retainer 78 includes a vertical side generally represented by numeral 84. The vertical side 84 has a desired height dimension. The vertical side 84 further includes a slit 86 which extends the entire height dimension. The slit 86 forms a first vertical edge 88 and a second vertical edge 90. In at least one embodiment the vertical side 84 is elastic, where the first vertical edge 88 and the second vertical edge 90 are compressed or placed under tension towards, and are disposed proximate, to each other in a first position 92. The first vertical edge 88 and the second vertical edge 90 may be released permitting the separation of the first vertical edge 88 from the second vertical edge 90 in the second position 94.

In at least one embodiment the mesh conical retainer 78 is at least partially conical in shape. In the mesh conical retainer 78 has a lower edge 96 which is formed into a holder circle 98 in the closed first position 92. In the closed first position 92, a top edge 100 is formed into an upper circle 102. The holder circle 98 has a diameter having a dimension which is smaller than the diameter dimension for the upper circle 102.

In at least one embodiment the mesh conical retainer 78 includes an inner surface which is coated with Teflon®, fluoropolymers, Kynar®, and/or Xylan® XLR or combinations thereof. The coating on the inner surface reduces wear, abrasion, friction and the sticking of the ice melting chemicals, liquid detergent, and water 28 to the inner surface, during compression and the formation of the impact dispersion ice melting projectile 10. The interior surface of any mold, cavity, rig, jig, and/or compression element or other device identified herein may be coated with a non-stick chemical or compound as identified above.

Figure 16:
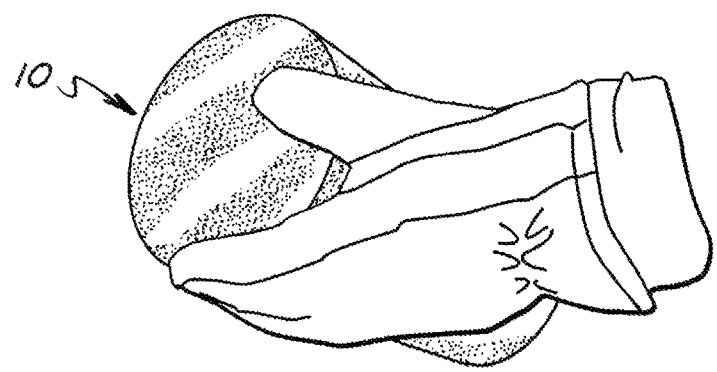
FIG. 16 is an isometric view showing one alternative embodiment of an impact dispersion ice melting projectile according to the disclosed invention.

In one embodiment as disclosed in FIG. 16, the impact dispersion ice melting projectile 10 is formed into a conical-cylindrical shape through the use of a mesh conical retainer 78.

Figure 17:
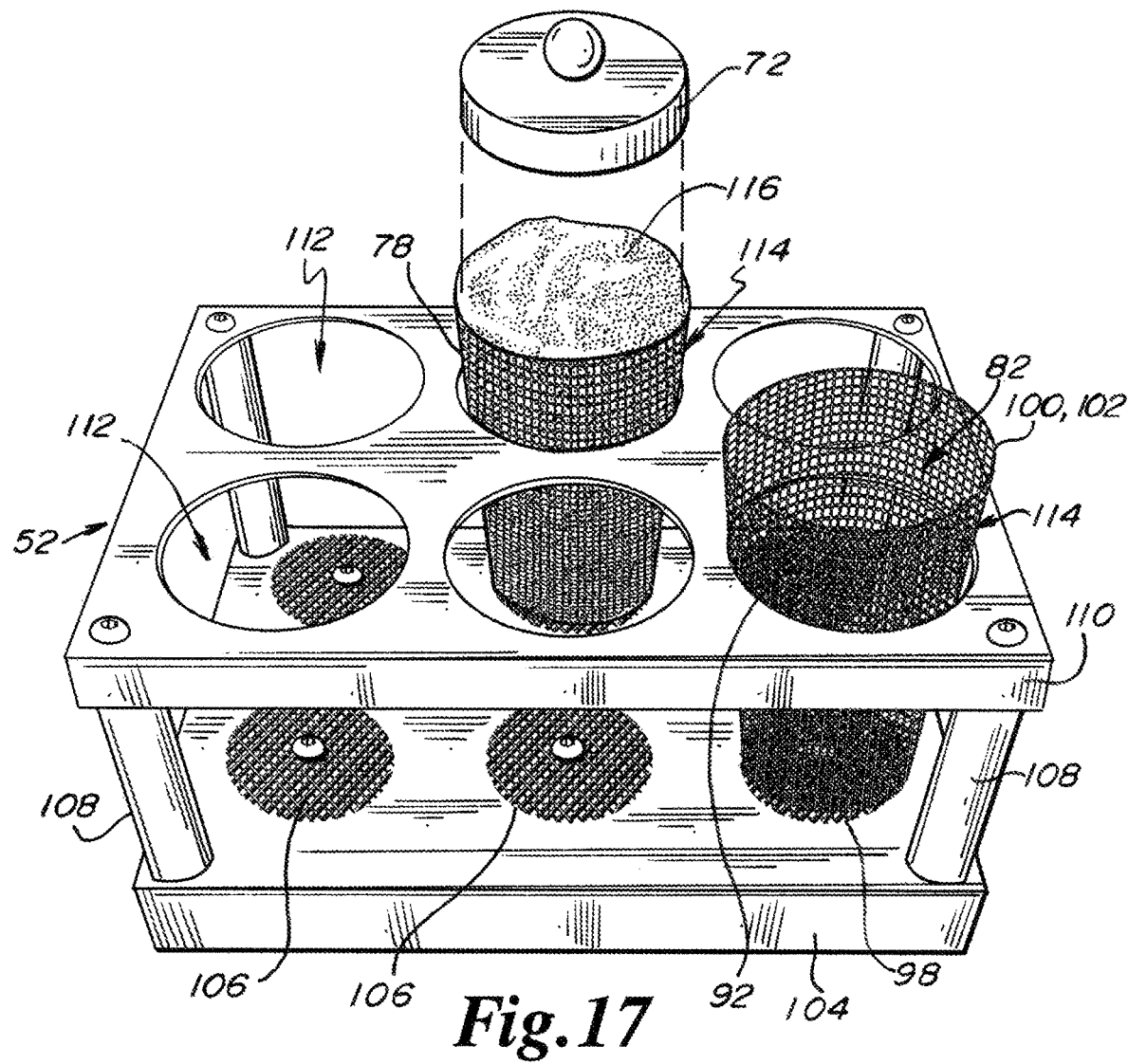
FIG. 17 is an isometric environmental view showing one alternative embodiment of a heating transport rig and mesh conical retainer according to the disclosed invention.

In one embodiment as disclosed in FIG. 17, a heating transport rig or jig 52 is disclosed. The heating transport rig or jig 52 of FIG. 17 shows the transportation of a plurality of mesh conical retainers 78 during the formation of the impact dispersion ice melting projectiles 10.

In at least one embodiment the heating transport rig or jig 52 includes a lower base 104. The lower base 104 has a plurality of evenly spaced circular perforated upper bases 106 which are releasably engaged to the lower base 104. Each of the upper bases 106 has a first diameter where each of the plurality of upper bases 106 is elevated relative to the upper surface of the lower base 104.

In at least one embodiment the heating transport rig or jig 52 includes a plurality of vertical support members 108. The vertical support members 108 each have a top. The heating transport rig or jig 52 also includes an upper support 110 engaged to the tops of the vertical support members 108. The upper support 110 includes a plurality of evenly spaced circular holes or openings 112. Each of the holes or openings 112 is preferably centered with respect to, and is disposed vertically above, one of the upper bases 106. Each of the holes or openings 112 has a second diameter where the second diameter has a larger dimension than the first diameter of the upper bases 106.

In one embodiment as depicted in FIG. 17 the heating transport rig or jig 52 may transport one or a plurality of mesh conical retainers 78 when the mesh conical retainers 78 are compressed into the closed first position 92. The first vertical edge 88 and the second vertical edge 90 may overlap in the closed first position 92. The diameter of the holder circle 98 may be smaller in dimension than the diameter of the upper bases 106 when the first vertical edge 88 and the second vertical edge 90 overlap in the closed first position 92. In addition, the diameter of the upper circle 102 may be smaller in dimension than the diameter of the holes or openings 112 in the upper support 110 when the first vertical edge 88 and the second vertical edge 90 overlap in the closed first position 92. In the in the closed first position 92 the mesh conical retainers 78 may be easily inserted into the holes or openings 112 where the holder circle 98 is disposed downwardly and proximate to an upper base 106.

In at least one embodiment following the insertion of one or more of the mesh conical retainers 78 into the holes or openings 112, when the lower edge 96 is proximate to an upper base 106, the compression force upon the mesh conical retainers 78 may be released. The mesh conical retainers 78 will automatically expand to an operative position 114 where the vertical side 84 is adjacent to, and is at least partially in contact with, the holes or openings 112.

In the operative position 114 the holder circle 98 will extend the lower edge 96 below, and surround an upper base 106, where the upper base 106 will act as a bottom or floor for the mesh conical retainer 78. The upper circle 102 is elevated above the upper support 110 in the operative position 114 defining an open interior 82 for the mesh conical retainers 78.

In the operative position 114, one or more of the mesh conical retainers 78 may be retractably inserted into the holes or openings 112. A mesh conical retainer 78 may be withdrawn from the heating transport rig or jig 52 by vertically lifting a the mesh conical retainer 78 upwardly until the holder circle 98 is elevated above one of the holes or openings 112. The expansion force from the elasticity of the vertical side 84 is not sufficiently strong to prevent the easy withdraw of a mesh conical retainer 78 upwardly from the heating transport rig or jig 52.

In the operative position 114, the salt or salt and ice melting chemical compositions 116 may be deposited within the interior of a mesh conical retainer 78 through the open upper circle 102 as seen in FIG. 17. Following the introduction of the salt or salt and ice melting chemical compositions 116 into the interior 82 of a mesh conical retainer 78 a compression element 72 may be set upon the upper exposed surface of the salt or salt and ice melting chemical compositions 116. The compression element 72 has a dimension which is smaller than the diameter of the upper circle 102 and will fit within the interior 82 of the mesh conical retainers 78. The compression element 72 may be of any desired shape, size or mass, and is preferably formed of metal or other non-melting material. The compression element 72 may be a metal puck, a rock, a ceramic element or other non-melting object. The compression element 72 has a desired mass which is sufficient to assist in compaction of the salt or salt and ice melting chemical compositions 116 through the force of gravity, or by the application of downward force on the top of compression element 72 as placed onto the top exposed surface of the salt or salt and ice melting chemical compositions 116.

Figure 18:
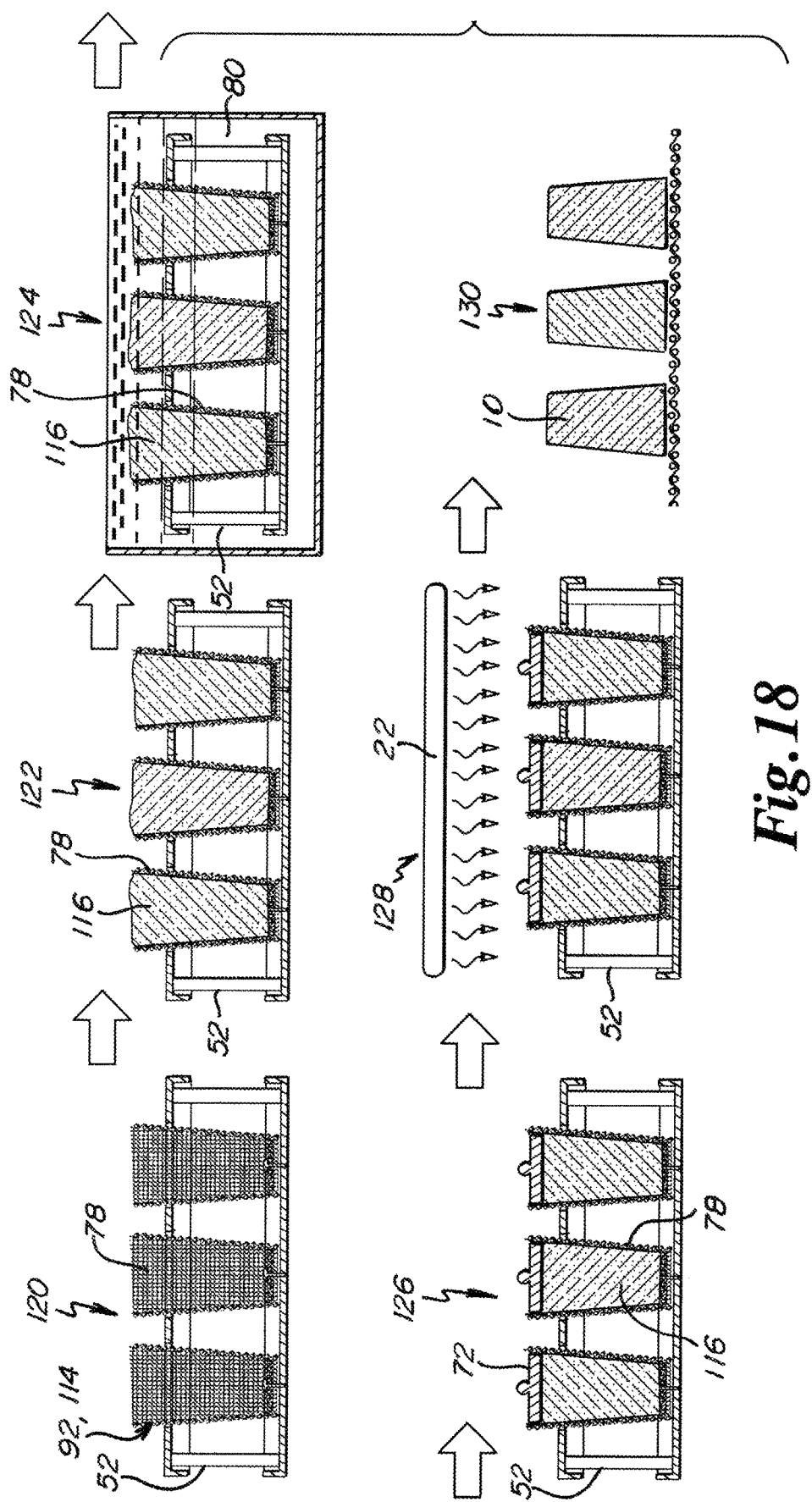
FIG. 18 is a cross-sectional side view of one embodiment of the heating transport rig and mesh conical retainers being processed according one alternative method of formation of the impact dispersion ice melting projectiles

In at least one embodiment as depicted in FIG. 18 the formation of the impact dispersion ice melting projectiles 10 in a cross-sectional side view is shown. The first step is indicated by the numeral 120. In the first step 120 the mesh conical retainers 78 have placed into the closed first position 92, and have been inserted into the holes or openings 112 of the heating transport rig or jig 52 and released into the operative position 114.

The second step is indicated by the numeral 122. In the second step 122 the interiors 82 of the mesh conical retainers 78 have been filled with salt or salt and ice melting chemical compositions 116.

The third step is indicated by the numeral 124. In the third step 124 the heating transport rig or jig 52 has been elevated and has been dipped 56 into a bath 80 of a mixture of liquid detergent, and water.

The fourth step is indicated by the numeral 126. In the fourth step 126 the heating transport rig or jig 52 has been withdrawn from the bath 80 containing a mixture of liquid detergent, and water. In addition, a compression element 72 has been placed onto the top of the upper exposed surface of the salt or salt and ice melting chemical compositions 116. The compression element 72 is located to the interior of the upper circle 102 and has initiated the compaction of the salt or salt and ice melting chemical compositions 116 as exposed to the mixture of liquid detergent, and water.

In an alternative embodiment the placement of the compression element 72 onto the top of the upper exposed surface of the salt or salt and ice melting chemical compositions 116 of fourth step 126, may occur before the dipping 56 of the heating transport rig or jig 52 in the bath 80 of the third step 124.

The fifth step is indicated by the numeral 128. In the fifth step 128 the heating transport rig or jig 52 has been placed into an oven 22. In the fifth step the heating transport rig or jig 52 and the salt or salt and ice melting chemical compositions 116, and the compression element 72 will be heated at a temperature of approximately 400° Fahrenheit for approximately 40 to 45 minutes establishing an impact dispersion ice melting projectile 10.

The sixth step is indicated by the numeral 130. In the sixth step 130 the heating transport rig or jig 52 has been withdrawn from the oven 22 and allowed to cool 134. The compression element 72 has been withdrawn from the upper surface of the salt or salt and ice melting chemical compositions 116. The mesh conical retainers 78 have been vertically withdrawn from the heating transport rig or jig 52. The mesh conical retainers 78 have been permitted to expand from the closed first position 92 to the open second position 94 and the impact dispersion ice melting projectile 10 has been separated from the interior of the mesh conical retainers 78.

In an alternative embodiment in a seventh step the impact dispersion ice melting projectiles 10 may be sprayed or otherwise coated 136 with a coating compound to establish an exterior shell. In some embodiments the coating 136 or exterior shell assists in the retention of the impact dispersion ice melting projectiles 10 in a desired shape prior to contact and dispersion 12 of the impact dispersion ice melting projectiles 10 upon an ice coated surface.

In some embodiments the coating 136 may easily fracture/disintegrate in a manner similar to an egg shell upon contact with an ice coated surface.

In at least one alternative embodiment, the manufacturing process for the formation of the impact dispersion ice melting projectiles 10 may occur through the dipping 56, draining 132, compressing 68, heating 70, cooling 134 and coating 136 for hardening of the exterior surface of the impact dispersion ice melting projectiles 10. The coating 136 of the exterior surface of the impact dispersion ice melting projectiles 10 will assist in improving the structural integrity of the impact dispersion ice melting projectiles 10.

In some embodiments, the exterior surface of the impact dispersion ice melting projectiles 10 may be exposed to a liquid spray process or an additional dipping process to assist in the formation of the outer shell.

In a preferred embodiment the outer shell may be water soluble and fairly rigid in order to facilitate the fracture, shatter or breakup of the outer shell upon impact with an ice coated surface. In some embodiments the coating 136 may be an additional polymer or an aerosol or non-aerosol extra firm hold hairspray. It should be noted that other types of polymers and/or compounds may be substituted for the polymers and/or compounds identified herein provided that the same are water soluble and/or provide a desired level of environmental protection.

Many alternative compounds may be utilized on the exterior of the impact dispersion ice melting projectiles 10 and one such compound is described in U.S. Pat. No. 5,294,437 commonly referred to as Aqua Net®, which is incorporated by reference herein in its entirety. In some embodiments the impact dispersion ice melting projectiles 10 may be spray coated with an aerosol compound and in other embodiments the impact dispersion ice melting projectiles 10 may be coated by dipping 56 in a desired solution. In some embodiments the impact dispersion ice melting projectiles 10 may be sprayed or dipped prior to drying.

In some embodiments the compounds used for application to the exterior surface of the impact dispersion ice melting projectiles 10 to form the coating 136 are formed of Water (Aqua), Dimethyl Ether, SD Alcohol 40-B (Alcohol Denat.), VA/Crotonates/Vinyl Neodecanoate Copolymer, Acrylates Copolymer, Aminomethyl Propanol, Sodium Benzoate, Cyclohexylamine, Triethyl Citrate, Cyclopentasiloxane, Sodium PCA, and combinations thereof. In other embodiments the compound used in the application to form the coating 136 is methocel. It should be noted that other compounds may be used in addition to, or in substitution for, the compounds identified herein.

In some embodiments after aerosol coating, wet spray coating, or dipping the impact dispersion ice melting projectiles 10 are permitted to dry at ambient conditions. In other embodiments, after aerosol coating, wet spray coating, or dipping, the coated impact dispersion ice melting projectiles 10 are exposed to heat as identified above to reduce manufacture time and to facilitate the formation of an outer shell structure.

In some embodiments the polymers identified herein may be formed of, but are not necessarily limited to a carboxylated, poly(vinyl alcohol) stabilized, vinyl acetate-ethylene (VAE) copolymer dispersion.

In a first alternative embodiment an ice melting device includes a melting compound selected from the group consisting of sodium chloride, potassium chloride, a surfactant, a polymer, a soap, a liquid soap, a liquid dish soap, water and combinations thereof, where the melting compound is mixed, compressed and dried into the shape of a projectile, wherein the projectile may be tossed or thrown onto a surface comprising ice, and further wherein upon contact with the ice, the shape of the projectile disintegrates forming a dispersion pattern of the ice melting compound onto the surface for melting the ice.

In a second alternate embodiment according to the first embodiment, the ice melting device further comprises a jig, wherein the jig is used to form the projectile, the jig comprising a lower base, the lower base having a plurality of circular perforated upper bases, each of the upper bases having a first diameter, the upper bases being engaged to the lower base, the upper bases being elevated relative to the lower base.

In a third alternate embodiment according to the second embodiment, the jig further comprises a plurality of vertical support members, the vertical support members having a top, the jig further comprising an upper support engaged to the tops of the vertical support members, the upper support having a plurality of holes, each of the holes being disposed vertically over one of the upper bases, each of the holes having a second diameter, the second diameter being larger than the first diameter.

In a fourth alternate embodiment according to the third embodiment, the jig further comprises a plurality of perforated conical holders, each of the perforated conical holders having a vertical side having a height dimension, the vertical side having a slit extending the entire height dimension, the slit forming a first vertical edge and a second vertical edge, the vertical side being elastic wherein the first vertical edge and the second vertical edge may be compressed and disposed proximate to each other in a first position and wherein the first vertical edge and the second vertical edge may be released and separated from each other in a second position.

In a fifth alternate embodiment according to the fourth embodiment, one of the perforated conical holders is retractably disposed in one of the holes and wherein each of the perforated conical holders is placed into the first position for releasable insertion into one of the plurality of holes.

In a sixth alternate embodiment according to the fifth embodiment, each of the perforated conical holders has a lower edge, each of the lower edges being formed into a holder circle in the first position, further wherein each of the holder circles is in surrounding engagement of one of the upper bases in an operative position, the upper bases being a floor for each of the perforated conical holders in the operative position, each of the perforated conical holders having an interior in the operative position.

In a seventh alternate embodiment according to the sixth embodiment, the mixed ice melting compound is placed into the interior in the operative position, the mixed ice melting compound having an upper exposed surface, where a compression element is placed above and in contact with the upper exposed surface, the compression element having a mass wherein gravity acts upon the compression element to compress the mixed ice melting compound.

In an eighth alternate embodiment according to the seventh embodiment, the jig and the mixed ice melting compound is exposed to heat for a duration of time forming the compressed and dried ice melting compound into the shape of the projectile, and further wherein the perforated conical holders and the projectile are vertically separated from the holes after expiration of the duration of time, the compression element is removed from the upper exposed surface after the expiration of the duration of time, and the first vertical edge is separated from the second vertical edge establishing the second position, wherein the projectiles are removed from the interior of the perforated conical holders.

In a ninth alternative embodiment a method of manufacture of an ice melting device includes placing an ice melting compound selected from the group consisting of sodium chloride, potassium chloride, and ice melting chemicals into a jig; adding a compression element on top of the ice melting compound; dipping the jig and the ice melting compound in a vessel, the vessel comprising a mixture of water, a surfactant, a polymer, a soap, a liquid soap, a liquid dish soap and combinations thereof; draining the jig and the ice melting compound of excess liquid; exposing the jig and the ice melting compound to heat of approximately 400° Fahrenheit for approximately 40 to 45 minutes establishing an ice melting projectile; cooling the jig and the projectile; and removing the ice melting projectile from the jig.

In a tenth alternate embodiment according to the ninth embodiment, the method further comprises coating the projectile following the removal of the projectile from the jig.

In an eleventh alternate embodiment according to the tenth embodiment, the projectile is one of a sphere, a cone and a cylinder.

In a twelfth alternate embodiment according to the eleventh embodiment, the projectile is a semi-sphere.

In a thirteenth alternate embodiment according to the twelfth embodiment, the method comprises the formation of two semi-spheres.

In a fourteenth alternate embodiment according to the thirteenth embodiment, the method further comprises placing a middle layer of the ice melting compound between the two semi-spheres and placing the two semi-spheres and the middle layer of the ice melting compound into a second jig.

In a fifteenth alternate embodiment according to the fourteenth embodiment, the method further comprises dipping the second jig and the two semi-spheres and the middle layer of the ice melting compound in a vessel, the vessel comprising a mixture of water, a surfactant, a polymer, a soap, a liquid soap, a liquid dish soap and combinations thereof; draining the jig and the two semi-spheres and the middle layer of the ice melting compound of excess liquid; providing a compressive force between the two semi-spheres to compress the middle layer; exposing the jig and the two semi-spheres and the compressed middle layer to heat of approximately 400° Fahrenheit for a duration of time of approximately 40 to 45 minutes establishing an ice melting projectile; cooling the jig and the projectile; and removing the ice melting projectile from the jig.

In at least one alternative embodiment, salt and/or salt and potassium chloride or other salt based ice melting compounds which has been dipped 56 in the water and liquid detergent solution and/or exposed to heating, may be placed into a yucca bag which may be formed of roots or vegetable material. The yucca bag containing the ice melting compounds will fracture and naturally degrade or dissolve following the striking of an impact dispersion ice melting projectile 10 upon an ice coated surface.

While this invention may be embodied in many different forms, there are shown in the drawings and described in detail herein specific embodiments of the invention. The present disclosure is an exemplification of the principles of the invention and is not intended to limit the invention to the particular embodiments illustrated.

The present invention may be embodied in other specific forms without departing from the spirit or essential attributes thereof; and it is, therefore, desired that the present description be considered in all respects as illustrative and not restrictive, reference being made to the appended claims rather than to the foregoing description to indicate the scope of the invention.

In addition to being directed to the embodiments described above and claimed below, the present invention is further directed to embodiments having different combinations of the features described above and claimed below. As such, the invention is also directed to other embodiments having any other possible combination of the dependent features claimed below.

Those skilled in the art may also recognize other equivalents to the specific embodiments described herein which equivalents are intended to be encompassed by the claims attached hereto.

The above disclosure is intended to be illustrative and not exhaustive. This description will suggest many variations and alternatives to one of ordinary skill in this art. The various elements shown in the individual figures and described above may be combined or modified for combination as desired. All these alternatives and variations are intended to be included within the scope of the claims where the term "comprising" means "including, but not limited to".

This completes the description of the embodiments of the invention. Those skilled in the art may recognize other equivalents to the specific embodiment described herein which equivalents are intended to be encompassed by the claims attached hereto.

I claim:

1. An ice melting device comprising:
a combined compound having sodium chloride mixed, compressed and dried with a soap and water and at least one additional compound selected from the group consisting of calcium chloride, potassium chloride, magnesium chloride, and calcium magnesium acetate, and combinations thereof, said combined compound being formed into a projectile, said projectile having a first compressed state and first compressed shape, said first compressed shape being selected from the group consisting of a sphere, a semi-sphere, a cone, a cylinder and an ovoid, said first compressed shape having a size being selected from the group consisting of a softball, a baseball, a tennis ball, an egg and a soup can, said projectile being constructed and arranged to be held in an individual's hand and to be tossed onto an iced surface, said first compressed state being dried and solid, said projectile having a second state and a second shape, said second state being granulated, said second shape being an impact dispersion fan shape after said projectile has struck said iced surface.

2. The ice melting device according to claim 1, wherein said projectile is coated with a mixture of water, and at least one of the group consisting of a surfactant, a polymer, a soap, a liquid soap, a liquid dish soap and combinations thereof.

3. The ice melting device according to claim 1, wherein said soap is selected from the group consisting of a liquid dish soap, a liquid hand soap and a degreaser and combinations thereof.

4. The ice melting device according to claim 3, said combined compound further comprising an additional compound selected from the group consisting of carboxylated polyvinyl alcohol and vinyl acetate-ethylene.

5. The ice melting device according to claim 4, said combined compound further comprising a coating, said coating being formed of coating compounds selected from the group consisting of water, dimethyl ether, denatured alcohol, vinyl neodecanoate copolymer, acrylates copolymer, aminomethyl propanol, sodium benzoate, cyclohexylamine, triethyl citrate, cyclopentasiloxane, sodium PCA, and combinations thereof, said coating forming an exterior shell on said projectile.

6. An ice melting device comprising:
a combined compound having sodium chloride mixed, compressed and dried with a soap or liquid soap and water said combined compound being formed into a projectile, said projectile having a first compressed state and first compressed shape, said first compressed shape being selected from the group consisting of a sphere, a semi-sphere, a cone, a cylinder and an ovoid, said first compressed shape having a size being selected from the group consisting of a softball, a baseball, a tennis ball, an egg and a soup can, said projectile being constructed and arranged to be held in an individual's hand and to be tossed onto an iced surface, said first compressed state being dried and solid, said projectile having a second state and a second shape, said second state being granulated, said second shape being an impact dispersion fan shape after said projectile has struck said iced surface.

7. The ice melting device according to claim 6, wherein said soap is selected from the group consisting of a liquid dish soap, a liquid hand soap and a degreaser and combinations thereof.

8. The ice melting device according to claim 7, said combined compound further comprising an additional compound selected from the group consisting of carboxylated polyvinyl alcohol and vinyl acetate-ethylene.

9. The ice melting device according to claim 8, said combined compound further comprising a coating, said coating being formed of coating compounds selected from the group consisting of water, dimethyl ether, denatured alcohol, vinyl neodecanoate copolymer, acrylates copolymer, aminomethyl propanol, sodium benzoate, cyclohexylamine, triethyl citrate, cyclopentasiloxane, sodium PCA, and combinations thereof, said coating forming an exterior shell on said projectile.

* * * * *